US009186019B2

(12) United States Patent
Masciandaro et al.

(10) Patent No.: US 9,186,019 B2
(45) Date of Patent: Nov. 17, 2015

(54) MACHINE TO PRODUCE COFFEE OR THE LIKE AND RELATIVE METHOD

(75) Inventors: Emanuele Masciandaro, Bergamo (IT); Michele De Nicolo, Milan (IT)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1454 days.

(21) Appl. No.: 12/444,238

(22) PCT Filed: Sep. 27, 2007

(86) PCT No.: PCT/IT2007/000672
§ 371 (c)(1),
(2), (4) Date: Nov. 4, 2009

(87) PCT Pub. No.: WO2008/041260
PCT Pub. Date: Apr. 10, 2008

(65) Prior Publication Data
US 2010/0112165 A1    May 6, 2010

(30) Foreign Application Priority Data

Oct. 4, 2006   (IT) ................. FI2006A0244

(51) Int. Cl.
*A47J 31/40* (2006.01)
(52) U.S. Cl.
CPC ........................... *A47J 31/405* (2013.01)
(58) Field of Classification Search
CPC ......... A47J 31/405; A47J 31/40; A47J 31/44; A23F 5/26
USPC .................... 99/275, 279, 280; 368/10, 98
See application file for complete search history.

(56) References Cited

U.S. PATENT DOCUMENTS

| 1,605,467 | A | * | 11/1926 | Rose | 137/160 |
| 3,120,440 | A | * | 2/1964 | Ross | 426/433 |
| 3,171,344 | A | * | 3/1965 | Mathieu et al. | 99/283 |
| 3,824,914 | A | * | 7/1974 | Casiano | 99/302 R |
| 4,188,863 | A | * | 2/1980 | Grossi | 99/286 |
| 4,189,991 | A | * | 2/1980 | Haddad | 99/302 R |
| 4,579,049 | A | * | 4/1986 | Rodrigues | 99/289 R |
| 4,651,632 | A | | 3/1987 | Motsch | |
| 4,681,028 | A | * | 7/1987 | Schmed et al. | 99/289 R |
| 4,725,714 | A | * | 2/1988 | Naya et al. | 392/480 |
| 4,796,521 | A | * | 1/1989 | Grossi | 99/287 |
| 4,797,296 | A | * | 1/1989 | Meier et al. | 426/433 |
| 4,885,986 | A | * | 12/1989 | Grossi | 99/289 R |
| 5,207,148 | A | * | 5/1993 | Anderson et al. | 99/281 |
| 5,259,296 | A | * | 11/1993 | Mikael et al. | 99/280 |
| 5,359,788 | A | * | 11/1994 | Gell, Jr. | 34/360 |
| 5,408,917 | A | * | 4/1995 | Lussi | 99/281 |

(Continued)

FOREIGN PATENT DOCUMENTS

DE    42 40 429 A1    6/1994
DE    4240429 A1  *  6/1994

(Continued)

*Primary Examiner* — Dana Ross
*Assistant Examiner* — Brandon Harvey (57) ABSTRACT

A machine for producing coffee and the like, includes an infusion unit (11) with an infusion chamber, a unit (31) to control dispensing cycles, a hydraulic circuit (1-13) to supply hot water to the infusion chamber, with a boiler (3) to heat the water and a pump (7) to supply water to the infusion unit. The machine also includes a system (22, 23, 25) for preheating the infusion chamber at the beginning of a dispensing cycle by feeding steam into said infusion chamber.

12 Claims, 5 Drawing Sheets

(56) References Cited

U.S. PATENT DOCUMENTS

| | | | | |
|---|---|---|---|---|
| 5,722,313 | A * | 3/1998 | Schmed | 99/289 R |
| 5,878,654 | A * | 3/1999 | Kobayashi et al. | 99/299 |
| 6,006,654 | A * | 12/1999 | Pugh | 99/293 |
| 6,182,555 | B1 * | 2/2001 | Scheer et al. | 99/290 |
| 6,286,416 | B1 * | 9/2001 | Van Der Meer | 99/293 |
| 6,401,729 | B1 * | 6/2002 | Ford | 134/22.1 |
| 6,739,240 | B2 * | 5/2004 | De Koning et al. | 99/283 |
| 6,959,642 | B1 * | 11/2005 | Landolt | 99/455 |
| 7,024,985 | B2 * | 4/2006 | Park | 99/302 P |
| 7,252,034 | B1 * | 8/2007 | Eckenhausen et al. | 99/293 |
| 8,250,969 | B2 * | 8/2012 | Sampaoli et al. | 99/287 |
| 2002/0002908 | A1 * | 1/2002 | Clean et al. | 99/280 |
| 2003/0066430 | A1 * | 4/2003 | Bitar et al. | 99/275 |
| 2003/0129286 | A1 * | 7/2003 | Knepler | 426/231 |
| 2003/0155101 | A1 * | 8/2003 | Minney | 165/58 |
| 2004/0177761 | A1 * | 9/2004 | Park | 99/279 |
| 2005/0061156 | A1 * | 3/2005 | Hart et al. | 99/275 |
| 2005/0104493 | A1 * | 5/2005 | Hart et al. | 312/334.1 |
| 2005/0223911 | A1 * | 10/2005 | Landolt | 99/455 |
| 2005/0279215 | A1 * | 12/2005 | Cai | 99/279 |
| 2007/0243305 | A1 * | 10/2007 | Marconi | 426/596 |
| 2007/0251459 | A1 * | 11/2007 | Fukushima et al. | 119/14.18 |
| 2008/0236402 | A1 * | 10/2008 | Yang | 99/300 |
| 2008/0276807 | A1 * | 11/2008 | Righetti | 99/289 R |
| 2009/0223374 | A1 * | 9/2009 | Morin et al. | 99/287 |
| 2010/0236417 | A1 * | 9/2010 | Sampaoli et al. | 99/287 |
| 2010/0236418 | A1 * | 9/2010 | Sampaoli et al. | 99/287 |

FOREIGN PATENT DOCUMENTS

| | | |
|---|---|---|
| EP | 465 877 A1 | 1/1992 |
| EP | 0 812 559 A1 | 12/1997 |
| EP | 0 948 926 A1 | 10/1999 |
| IT | 1290279 | 10/1998 |
| JP | 6096354 A | 5/1985 |
| JP | 60210218 A | 10/1985 |
| JP | 03198821 A | 8/1991 |
| JP | 04354912 A | 12/1992 |
| JP | 09265574 A | 10/1997 |
| JP | 11120434 A | 4/1999 |
| JP | 2001023035 A | 1/2001 |
| JP | 2004187697 A | 7/2004 |

* cited by examiner

MACHINE TO PRODUCE COFFEE OR THE LIKE AND RELATIVE METHOD

TECHNICAL FIELD

The present invention relates to improvements to machines, in particular to automatic machines, to produce hot beverages by infusion. In particular, although not exclusively, the present invention relates to improvements to machines to produce coffee.

According to a different aspect, the present invention also relates to improvements to processes and methods to produce hot beverages by infusion, in particular—although not exclusively—to produce coffee.

STATE OF THE ART

To produce espresso coffee and other beverages by infusion supplying hot water through a product from which the beverage is to be extracted (such as coffee powder or the like), machines are known comprising an infusion unit with an infusion chamber formed of at least two portions, one moving in relation to the other from an open position to a closed position and vice versa. The initial material or product, which can be a loose powder, a single serving sachet containing the powder, a soluble material or the like, is placed in the infusion chamber. Hot water at a suitable pressure is supplied through the infusion chamber which, passing through said product, extracts the substances to produce the beverage, or causes them to dissolve. A suitably programmed control unit controls the dispensing cycles and a hydraulic circuit is provided to feed the hot water to the infusion chamber. The circuit typically has a boiler to heat the water and a pump to supply hot water to the infusion unit.

These machines can be variously structured also according to the type of use for which they are intended. There are machines for domestic use, of smaller dimensions and often automated to a lesser extent, machines for professional use and "automatic distributors" or "vending machines". The last named are fully automatic machines programmed to dispense the beverage upon payment of a cost using coins, paper notes, rechargeable debit cards or other payment systems known per se. These machines are normally designed to dispense beverages of various types, such as coffee, tea, milk, cappuccino, hot chocolate or the like. In some cases the beverage is obtained by extracting substances from insoluble powders by infusion with hot water, while for other types of beverage soluble powders that dissolve in hot water are utilized.

To produce coffee in particular (although the problem can also exist when producing other beverages or substantially liquid food products in general), the problem exists that at the beginning of a dispensing cycle the temperature of the infusion chamber is lower than the ideal temperature, and therefore on the one hand extraction of the substance from the product fed to the infusion chamber is not satisfactory and on the other the dispensed beverage is not sufficiently hot. All this has a negative effect on the organoleptic properties of the product dispensed from the machine.

Systems have therefore been studied to avoid these drawbacks. For example, EP-B-948926 describes an automatic distributor, in which a portion of the infusion chamber is maintained in contact with a heating body (heated by an electrical resistor), to maintain at least part of the infusion chamber at the desired temperature during the time interval between one dispensing cycle and the next. When a dispensing cycle begins, the machine is controlled by a control unit so that the portion of the infusion chamber which is temporarily in contact with the electrical resistor is moved away therefrom so that heating of the infusion chamber ceases before the cycle to dispense the beverage requested by the user begins.

IT-B-1290279 describes a similar system, in which however the portion of infusion chamber is maintained at the ideal temperature by contact with a heating body which receives heat directly from the boiler used to heat the water for infusion of the beverage rather than by a resistor specifically provided for this purpose.

EP-B-465877 describes a machine, particularly intended for professional use, in which an electrical resistor maintains a part of the infusion chamber at the required temperature.

OBJECTS AND SUMMARY OF THE INVENTION

According to a first aspect, an object of the present invention is to provide a coffee machine, and more generally a machine to produce hot beverages by extraction of substances from an initial loose product, which overcomes in an original way the problem of heating the infusion chamber, obtaining further advantages unobtainable with prior art systems.

According to an advantageous embodiment, the invention provides for a machine to produce hot beverages, in particular coffee and the like, with an infusion chamber, a control unit and a hydraulic circuit with a boiler to heat the water, provided with a system to preheat the infusion chamber, as initial step of a dispensing cycle, by feeding steam into said infusion chamber.

A system of this type has considerable advantages over prior art devices. In particular, by avoiding continuous heating during the whole time interval between one dispensing cycle and the next (which can even be very long especially in vending machines), considerable amounts of energy can be saved. Secondly, the steam fed into the infusion chamber in the initial step of the dispensing cycle not only heats the infusion chamber effectively, but also heats the pipes to supply the water and dispense the beverage from the infusion chamber. This results in an improved heating effect and consequently the dispensed beverage is of higher quality.

Besides heating the pipes and the infusion chamber, the hot steam fed into the infusion chamber through the hydraulic feed circuit also has a washing and sterilizing effect, and removes any residues, even deposits, with a consequent cleansing effect of the infusion unit and in particular of the filters.

Therefore, in substance, in relation to prior art systems, the heating system of the present invention provides heating of the infusion chamber only when this is required, with a system which, besides more effective heating, also performs other positive actions on the infusion unit to improve operation and duration thereof and consequently reduces maintenance costs.

According to a different aspect, the invention relates to a method to produce a hot beverage by infusion of a product inside an openable and closable infusion chamber, wherein an initial step to heat the infusion chamber by feeding steam is provided in at least some of the infusion cycles.

Further advantageous features and embodiments of the machine and of the method according to the invention are described hereunder and are indicated in the appended claims, which form an integral part of the present description.

BRIEF DESCRIPTION OF THE DRAWINGS

The invention will be better understood by following the description and accompanying drawing, which shows a non-limiting practical example of the invention. In the drawing.

DETAILED DESCRIPTION OF EMBODIMENTS OF THE INVENTION

Figure 1:
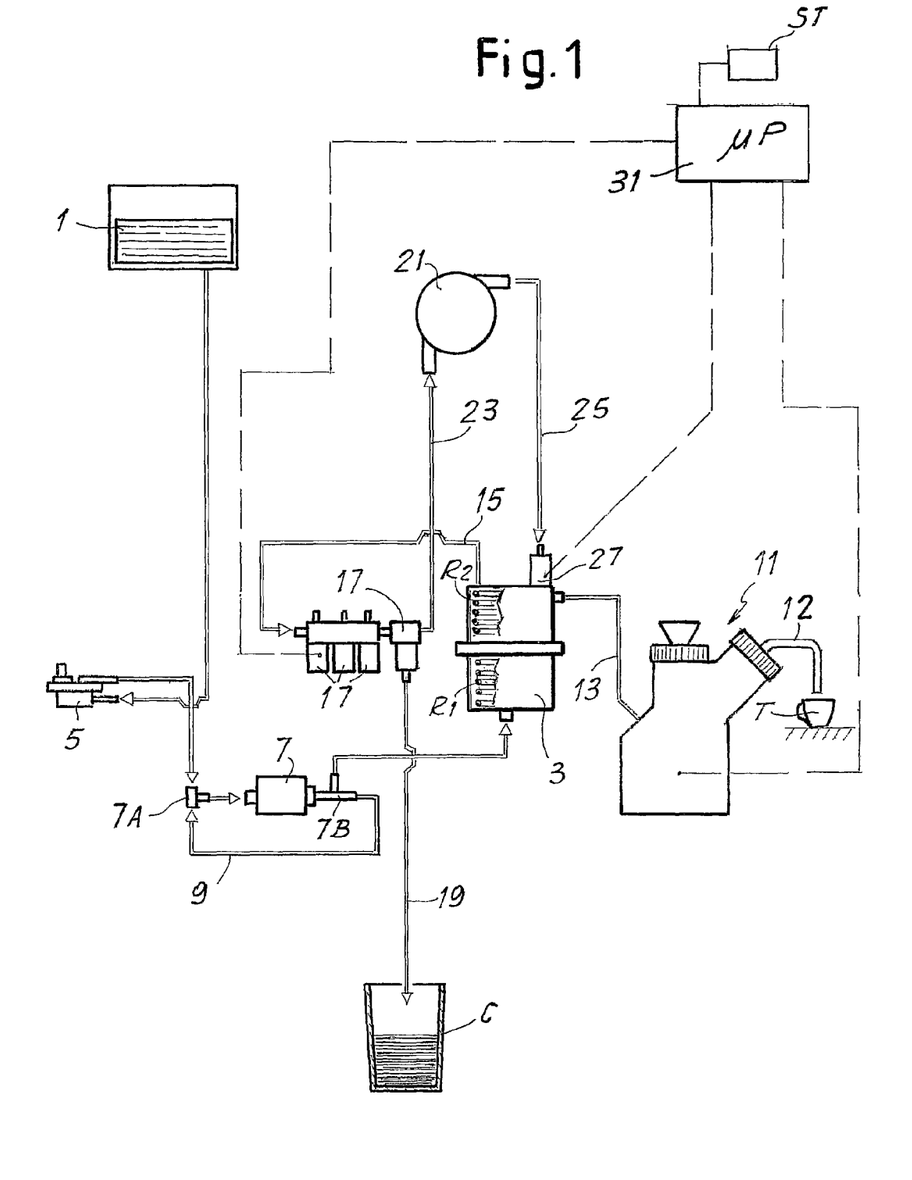
FIG. 1 shows a diagram of the hydraulic circuit of a machine according to the invention.

With initial reference to FIG. 1, the basic elements of a machine according to the invention will initially be described, the other components of the machine being known and therefore not described.

Hereunder, specific reference will be made to a machine to produce coffee, it being understood that the concepts underlying the invention can also be utilized to provide machines to produce beverages of other type, each time there is the need to heat or preheat the beverage infusion or production unit in the initial step of the dispensing cycle.

In FIG. 1 the numeral 1 indicates a water tank that supplies water at ambient temperature to a boiler 3. According to an advantageous embodiment, a flow meter 5 is provided along the path of the water from the tank towards the boiler 3. According to an advantageous embodiment, located downstream of the flow meter 5 is a pump 7 to feed water into the boiler 3, with a three-way valve 7A on the inlet and a three-way valve 7B on the outlet, and a discharging branch of the safety valve.

The numeral 11 generically indicates an infusion unit, the structure of which will be described in greater detail hereunder.

The numeral 12 indicates the pipe for dispensing the beverage into a cup T, while the numeral 13 indicates the pipe to supply hot water from the boiler 3 to the infusion unit 11.

According to an advantageous embodiment indicated in FIG. 1, the machine has a second pipe 15 to supply hot water from the boiler 3 towards an assembly of systems 17 to dispense of beverages other than coffee, such as beverages obtained by solubilization of freeze-dried powders or the like. The letter C indicates a generic container under a pipe 19 for discharging the circuit at the end of the beverage dispensing cycle.

According to an advantageous embodiment illustrated in FIG. 1, the hydraulic circuit of the machine comprises a steam generator 21 which is supplied through a pipe 23 by water coming from the boiler 3. In an advantageous embodiment, said pipe 15 supplies both the systems 17 and the steam generator 21, through suitable control of the valves, of a type known per se, of the system 17.

According to an advantageous embodiment, a pipe 25 is provided to connect the outlet of the steam generator 21 to a first inlet of a three-way valve 27, the second inlet of which is in connection with the inside of the boiler 3 and the outlet of which is in connection with the pipe 13 that supplies hot water to the infusion chamber 11.

According to a different embodiment, not shown, the steam generator 21 can be supplied by a secondary boiler, separate from the boiler 3. According to yet another embodiment, not shown, the steam generator 21 can be supplied with water at ambient temperature, for example by a branch on the delivery side of the pump 7. In this case the steam generator must raise the temperature of the water from ambient temperature to the temperature of the steam supplied to the infusion unit 11. In general, notwithstanding the solution chosen, the steam generator 21 produces the steam required for preheating, sanitizing and/or sterilizing and cleansing the infusion unit 11.

However, according to a different embodiment, the steam for the infusion chamber could also be generated directly by the boiler 3. In this case, two different electrical resistors, indicated schematically with R1 and R2 and located inside the boiler 3, could, for example, be utilized. The resistor R1 can be activated to heat the water and maintain it at the temperature required to produce the beverage, while the resistor R2 could be activated when a greater amount of heat is required to produce steam to preheat the infusion unit 11. The pre-heating steam can also be taken from the top of the boiler 3, thus achieving a limited result but at very low cost. However, the use of a separate steam generator 21 to produce steam is preferable as it allows better control of the various steps of the dispensing cycle. When a steam generator is utilized, it is particularly advantageous for this to receive water already preheated to a certain temperature by the boiler 3 or by a secondary boiler. If the boiler that supplies the hot water to the steam generator is the same as the one producing hot water for the infusion unit, this offers the further advantage of reducing the machine components and consequently also the difficulty of controlling these and the overall cost of the machine.

The numeral 31 generically indicates a control unit used to control the infusion unit 11, the boiler 3, the pump 7, the soluble beverage dispensing system 17, the solenoid valves and, in any case, in general any machine member that requires to be controlled as a function of the conditions in which the machine operates and of the program set by the user with the choice of the beverage to be dispensed. The control unit 31 will be interfaced with suitable sensors and/or transducers, such as in particular the flow meter 5, any temperature sensor associated with the boiler 3, an optional temperature sensor associated with the steam generator 21, any external temperature sensor indicated with ST for the purposes explained hereunder. A control of the water level in the tank 1 and other suitable transducers and sensors of a type known per se and not described herein can also be provided.

The infusion unit 11 can have an infusion chamber of the type known per se. FIGS. 2A to 2F show a diagram of a possible infusion unit 11 with an infusion chamber 33 comprising two parts 33A, 33B, one moving in relation to the other. It must be understood that the illustration shows only one of the possible infusion units to which the invention can be applied. In fact, in general the concepts underlying the invention can be practically and advantageously utilized in combination with any infusion unit that can benefit from being preheated in the initial step of a cycle to dispense beverages.

In the diagram in FIGS. 2A to 2F, the infusion chamber comprises a first moving portion 33A and a second fixed portion 33B. The purpose of the fixed portion 33B is to close the infusion chamber 33 in the position to dispense the beverage. The portion 33A forms an inner compartment 35, into which the product from which the aromas must be extracted by the hot water supplied from the boiler 3 is fed.

In this embodiment, the infusion unit 11 has a hopper 36 through which the coffee powder is fed into the infusion chamber and more specifically into the volume 35 of the moving portion 33A of said chamber. However, it would also be possible for the infusion unit 11 to be configured to operate with pre-packed single serving capsules or pods of the type know per se, which can for example be dispensed from an automatic loader.

According to an advantageous embodiment, a chute 37 is associated with the moving portion 33A of the infusion chamber to discharge the spent coffee powder, said chute cooperating with a sort of fixed doctor blade 39 with which the moving portion 33A of the infusion chamber cooperates in the manner that will be more apparent hereunder.

Located in the bottom of the compartment 35 provided in the moving portion 33A of the infusion chamber 33 is a perforated moving element 41, through which the steam flows in the preheating step of the dispensing cycle and the water flows in the infusion step. The numeral 13 indicates the pipe through which steam is fed in the preheating step, water is fed in the infusion step and from which residual water is discharged in the final step of the dispensing cycle.

In a possible embodiment, the upper portion 33B of the infusion chamber 33 is fixed and connected thereto is the pipe, again indicated with 12, through which the beverage produced in the infusion chamber 33 is delivered.

In an advantageous embodiment, a mechanism is provided, indicated generically with 47, for oscillation of the moving portion 33A of the infusion chamber 33 and sliding of the bottom 41 inside the portion 33A to carry out the compacting cycle of the coffee powder in the infusion chamber, the actual infusion cycle and discharge of the exhausted coffee, according to the steps which will be described hereunder.

According to a particularly simple embodiment of the invention, preheating can be implemented as the initial step of each dispensing cycle. Nonetheless, this does not take account of the fact that the temperature of the infusion unit, and in particular of the infusion chamber 33, can remain for a certain time interval at a value suitable for infusion of the beverage for a relatively long time, also due to thermal inertia of the materials (usually plastic) of which most of the components of the infusion unit 11 are made.

Therefore, according to an advantageous embodiment, the control unit 31 is programmed so that it only activates a preheating step at the beginning of an infusion cycle when at least one condition to enable preheating is satisfied. As a rule, this condition can, for example, be represented by the temperature of the infusion unit, or of the infusion chamber, detected in a suitable point of the chamber. According to a possible embodiment, for example, a temperature sensor can be associated with the moving portion 33A of the infusion chamber.

Nonetheless, the use of a temperature sensor associated with the infusion chamber can cause some complications with regard to construction and maintenance, due to the possibility of the sensor breaking with a certain frequency, in view of the difficult conditions in which it would have to operate.

Therefore, according to a different currently preferred embodiment, the condition to enable heating is determined on a time basis, i.e. as a function of the time that has elapsed since the last infusion cycle performed by the machine. In this case the fact that the infusion unit cools gradually dissipating heat into the environment is taken into account. In the design phase it is possible to determine the speed with which the temperature of the infusion unit decreases when it is idle and consequently to establish a certain specific time interval from the last dispensing operation after which the control unit 31 activates the preheating step as initial operation of the subsequent dispensing or infusion cycle.

As the speed with which heat is dissipated from the infusion chamber 33A, 33B towards the outside environment is a function of the thermal gradient and therefore ultimately of the ambient temperature, according to an advantageous embodiment of the machine, the temperature sensor ST is provided, interfaced with the control unit 31, with which the latter can acquire the value of the outside temperature and determine the time interval (after which preheating of the infusion unit 11 is required during the subsequent dispensing cycle) as a function of the ambient temperature. The lower the ambient temperature, the shorter the time interval will be, after which it will in any case be necessary to preheat the infusion unit 11 before carrying out the subsequent infusion cycle. The control unit 31 can be programmed to set the time each time as a function of the temperature detected by the sensor ST. Nonetheless, it would also be possible for this setting to be made only during installation of the machine, especially when there are no substantial variations in the ambient temperature conditions. Otherwise, the time can be set the first time the machine is switched on, by reading the ambient temperature automatically. The machine can also be set by the operator during installation to establish the aforesaid time interval as a function of the ambient temperature measured by the installer and modified if required by an operator each time the machine is serviced.

All this being stated, a dispensing cycle of a machine configured to enable preheating when specific time conditions are satisfied as a function of the immediately preceding dispensing cycle will now be described with reference to the sequence of FIGS. 2A to 2F.

Figure 2A:
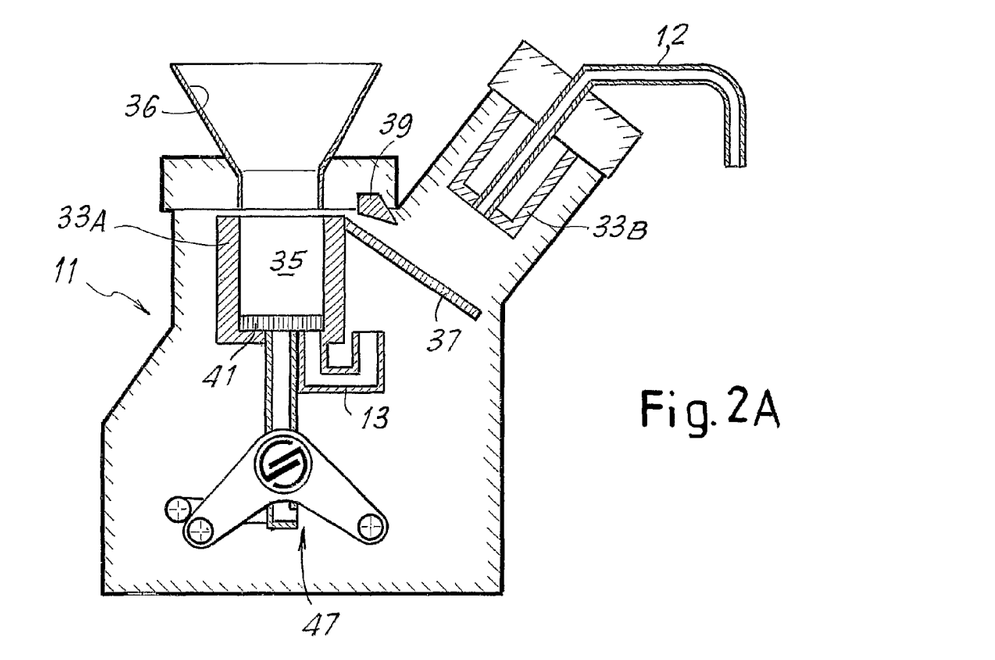
FIGS. 2A to 2F schematically show the infusion unit in a sequence of operating steps.

FIG. 2A shows the infusion unit 11 when the machine is switched on or at the end of a dispensing cycle. The infusion unit takes the position with the infusion chamber open, and more specifically with the portion 33A under the hopper 36. This is indicated as "open stand-by position" or "idle position".

The control unit 31 can advantageously be programmed to maintain this condition for a specific time, for example in the order of 10 seconds, indicated as "unit closing time-out". If the subsequent dispensing cycle is activated within this time interval, the machine begins said subsequent dispensing cycle without preheating and dispensing the coffee powder directly through the hopper 36 into the portion 33A of the infusion chamber and then carrying out the subsequent steps described hereunder with reference to FIGS. 2D-2F.

Figure 2B:
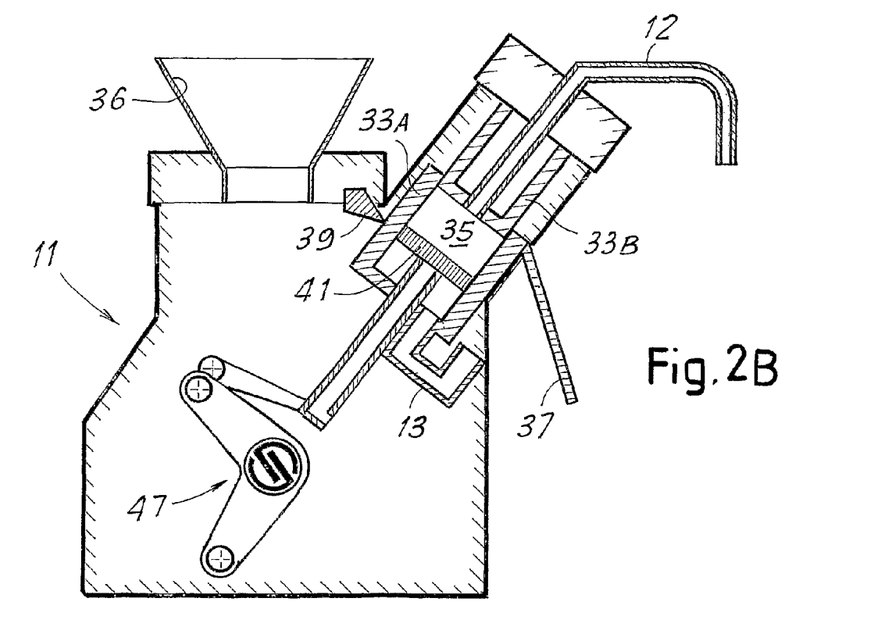

If, instead, during the "unit closing time-out" time interval a new dispensing cycle is not requested, according to an advantageous embodiment of the invention the infusion unit takes the position in FIG. 2B, with the infusion chamber 33 comprised of the portions 33A, 33B, in the closed position, indicated hereunder as "closed stand-by position". In this way heat dissipation towards the outside is reduced, thereby increasing the time interval during which, notwithstanding heat dissipation towards the outside environment, the infusion unit still maintains a suitable temperature to carry out the subsequent dispensing cycle without preheating. However, it would also be possible for this closing step of the infusion chamber not to take place and for the infusion chamber to remain in the open position (FIG. 2A) until the subsequent dispensing cycle. In this case, there will be a decrease in the time interval between one dispensing cycle and the next which, once elapsed, enables—or requests—preheating as the preliminary step of the subsequent dispensing cycle. The solution illustrated, with closing of the infusion unit is more advantageous in terms of energy, as it reduces the dissipation of thermal energy.

Returning now to the embodiment illustrated, when the user requests dispensing of a coffee with the unit 11 in the position in FIG. 2B, the dispensing cycle will commence without preheating if a time below the preset time has elapsed between closing of the unit 11 and the request for dispensing, hereunder indicated as "steam generation time-out". This time, e.g. in the order of some minutes, e.g. 2-7 minutes, preferably 3-5 minutes is sufficiently limited to guarantee that the temperature of the infusion chamber 33 is still sufficient to produce a coffee with suitable organoleptic properties, without preheating.

Figure 2C:
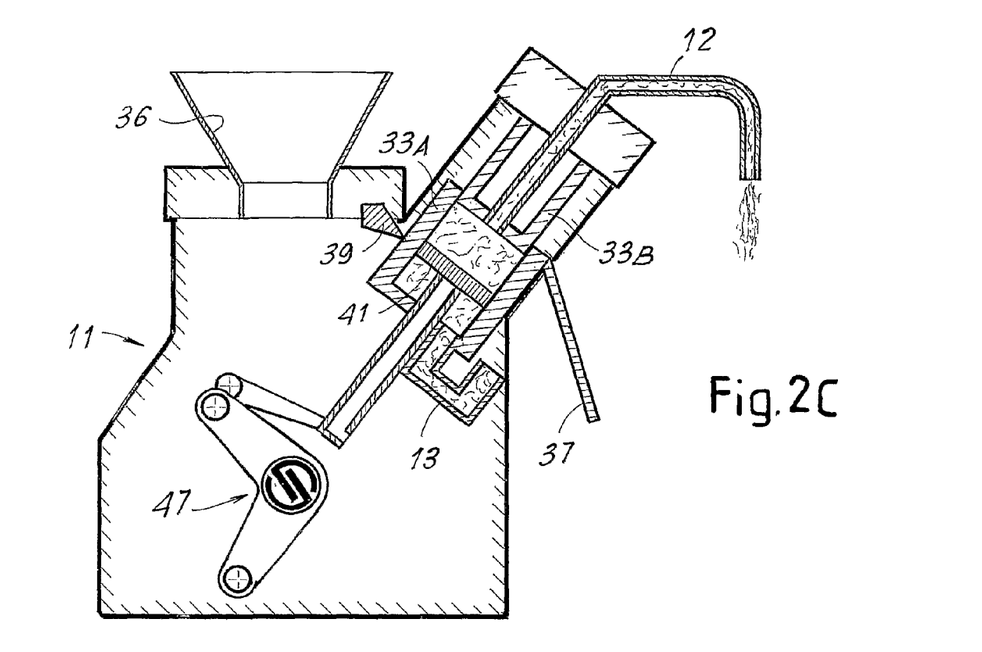

If the time elapsed from closing of the unit 11 is above the "steam generation time-out" time, when a subsequent dispensing cycle is requested, the control unit 31 will activate a preheating and sanitizing step of the infusion chamber 33, as shown in FIG. 2C.

Advantageously, this preheating operation takes place by feeding to the infusion chamber 33 a suitable quantity of steam through the steam generator 21, the pipe 25, the three-way valve 27 and the pipe 13. The infusion chamber 33, filled with superheated steam, remains closed for a "unit closing dwell time", e.g. equal to 10 seconds. This on the one hand allows transfer of an adequate quantity of heat from the steam to the metal and plastic masses forming the components of the infusion unit in contact with the steam, and on the other performance of any other operations that the machine must carry out to dispense the beverage. In the case of a vending machine, these operations can, for example, include dispensing a cup, dispensing the sugar and stick, grinding a dose of coffee.

Figure 2D:
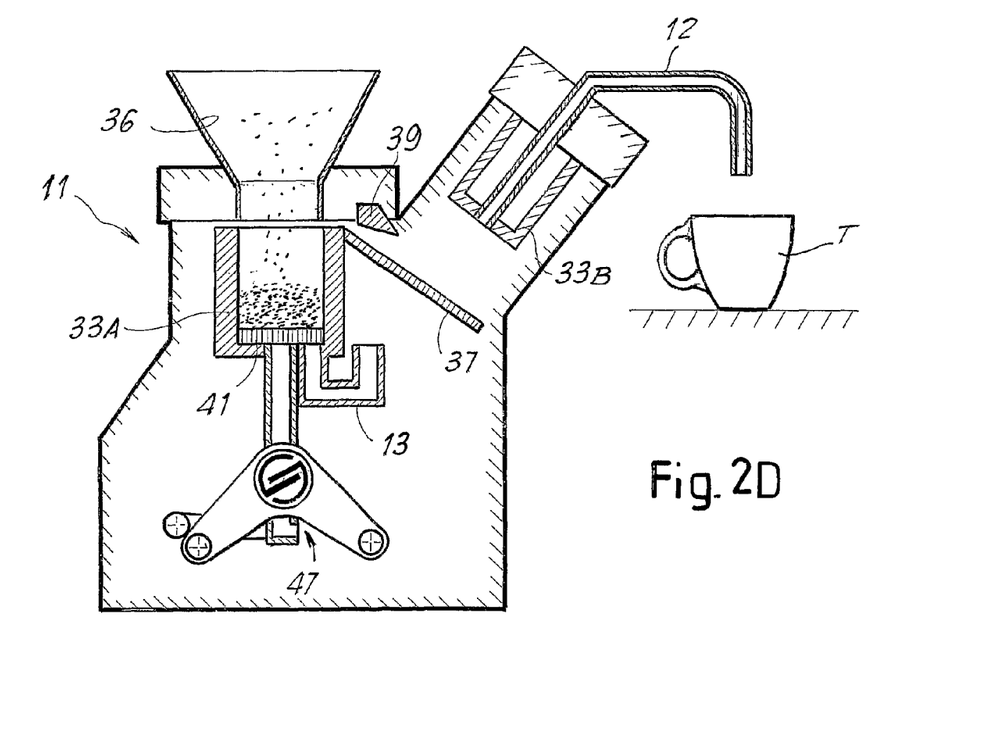
Figure 2E:
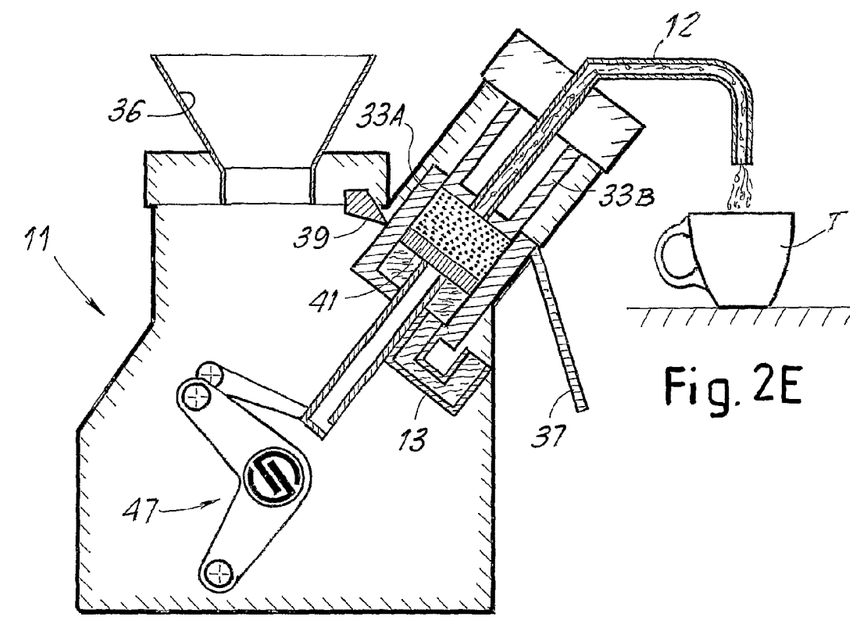

After the "unit closing dwell time", the infusion chamber opens as shown in FIG. 2D, to receive the coffee powder through the hopper 36. Subsequently (FIG. 2E) the infusion chamber is closed again and hot water is supplied therethrough to produce the coffee. For this purpose the valve 27 is switched, so that the flow of water supplied by the pump 7 causes feed of hot water from the top of the boiler 3 directly into the pipe 13.

Figure 2F:
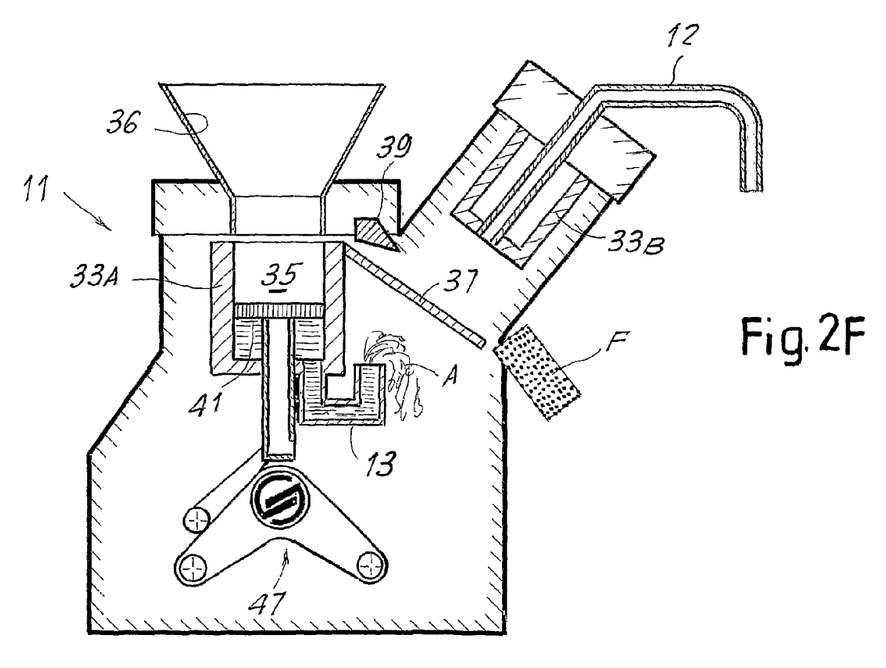

At the end of the coffee infusion an extraction step, the infusion chamber opens to discharge the ground F of spent powder and the water A, as indicated in the FIG. 2F. At the end of this step the unit is in the position of FIG. 2A.

With the method and the device described successive extractions of coffee can be obtained, even at a distance from one another, which are uniform as regards presentation and temperature without resorting to direct and continuous heating of mechanical parts, but rather with heating only activated on request and only when specific operating conditions occur.

As mentioned above, this system has considerable advantages in relation to the conventional systems, including:

- the steam cleans the remains of ground coffee and any limescale from the circuit, especially with regard to the filters of the infusion unit;
- the hydraulic pipes of the hot water from the boiler to the infusion chamber and of the coffee towards the dispensing spout are heated before passage of the coffee, increasing the output of the boiler system and coffee unit.

Therefore, high efficiency in terms of heating is obtained, due to the fact that this takes place inside the infusion chamber and also involves the remaining parts of the hydraulic circuit through which the water and coffee flow and not just a portion of the infusion chamber, as is the case in conventional systems. Moreover, the system is particularly efficient in terms of energy saving, as the preheating step is only activated when actually necessary, taking advantage of the thermal inertia of the infusion chamber.

It would also be possible to vary the structural and functional properties of the device and the operating steps of the method according to the invention, if necessary relinquishing some of the aforesaid advantages.

For example, the steam could be fed into the infusion chamber through a different pipe to the one, indicated with 13, through which the hot water to produce the coffee is also supplied. This implies increased construction cost and decrease in the degree of efficiency, but nonetheless allows the advantage of a combined heating and cleaning effect and also allows preheating to be carried out only when strictly necessary, with consequent advantages in terms of energy saving.

Moreover, the system described above advantageously uses a common three-way solenoid valve to supply hot water to the system 17 for dispensing beverages obtained by extraction from soluble powders and, alternatively, to the steam generator 21. However, the invention can also be applied to machines intended exclusively for the production of one type of beverage, such as coffee, in which case the system 17 will be missing. Vice versa, in the case of a multi-use machine with a unit 17 to produce beverages using soluble powders or the like, a supply circuit of the unit 17 differing from the supply circuit of the steam generator 21 can be provided. Also in this case this implies increased construction cost and decreased efficiency of the system, but still offers the main advantage of controlled heating of the infusion unit 11 using steam, with decrease in energy consumptions and the performance of a washing and sterilizing action of the infusion unit.

It is understood that the drawing only shows an example provided by way of a practical arrangement of the invention, which may vary in forms and arrangements without however departing from the scope of the concept underlying the invention. Any reference numerals in the appended claims are provided to facilitate reading of the claims with reference to the description and to the drawing, and do not limit the scope of protection represented by the claims.

Figure 3:
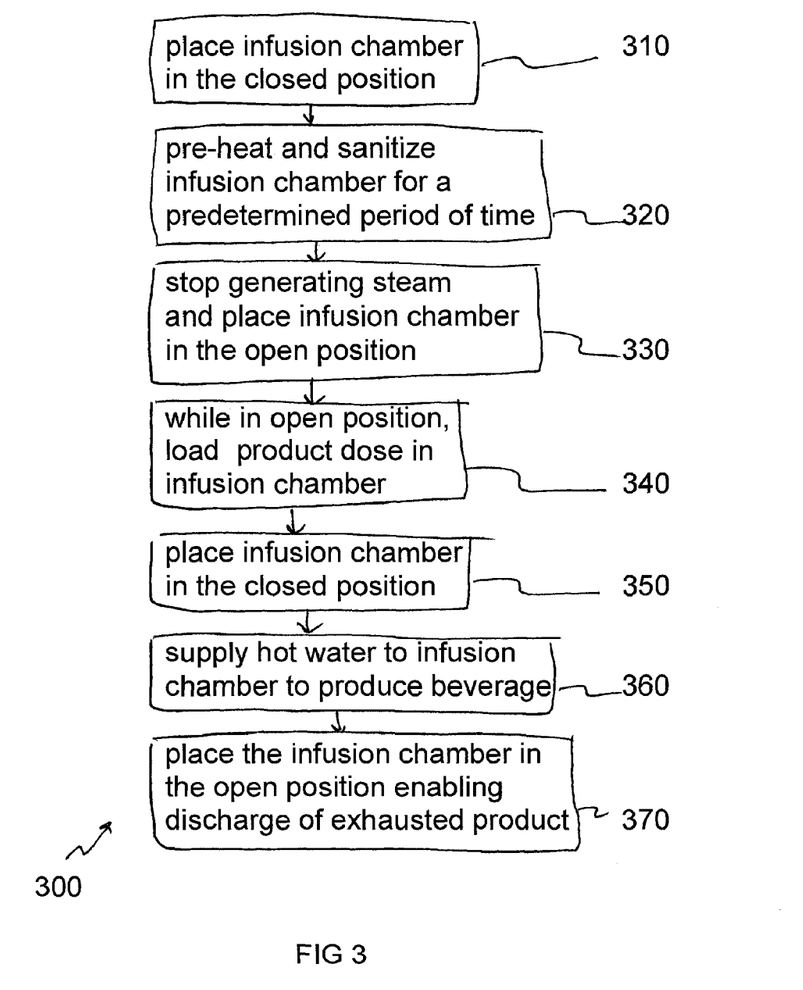

FIG. 3 shows a flow chart 300 of the operations that are performed by the control unit. As shown in box 310, the mechanism is controlled to place the infusion chamber in the closed position. In box 320, pre-heating and sanitizing of the infusion chamber is performed for a predetermined period of time by controlling the steam generator to generate steam and by controlling the hydraulic circuit to direct steam from the steam generator into the infusion chamber, where the infusion chamber is devoid of product for producing the beverage during the pre-heating and sanitizing. In box 330, the steam generator is controlled to stop generating steam, the hydraulic circuit is controlled to stop directing the steam to the infusion chamber, and the mechanism is controlled to place the infusion chamber in the open position. In box 340, while in the open position, the loading of a dose of a product is enabled for producing the beverage in the infusion chamber. In box 350, the mechanism is controlled to place the infusion chamber in the closed position. In box 360, the boiler, the pump and the hydraulic circuit are controlled to supply hot water to the infusion chamber to produce the beverage. In box 370, the mechanism is controlled to place the infusion chamber in the open position enabling discharge of the exhausted product therefrom.

The invention claimed is:

1. A machine to produce beverages comprising:
   an infusion unit with an infusion chamber comprising a first portion and a second portion, reciprocally movable in relation to each other to compact coffee powder in the infusion chamber, and translatable with respect to each other to take an open position and a closed position of said infusion chamber;
   a mechanism for effecting the reciprocal movement and the translating movement of at least one of said first and second portions;
   a control unit programmed to automatically control dispensing cycles; and
   a boiler to heat water and a pump to supply hot water from the boiler, a steam generator for generating steam, and a hydraulic circuit to selectively supply hot water or steam to said infusion chamber, wherein said control unit automatically controls a dispensing cycle by performing the acts of:
controlling said mechanism to place the infusion chamber in the closed position;
pre-heating and sanitizing said infusion chamber for a predetermined period of time before a dose of a product for producing said beverage is provided in said infusion chamber by controlling said steam generator to generate steam and by controlling said hydraulic circuit to direct steam from said steam generator into said infusion chamber, said infusion chamber being devoid of product for producing said beverage during said pre-heating and sanitizing;
controlling said steam generator to stop generating steam, controlling said hydraulic circuit to stop directing the steam to the infusion chamber, and controlling said mechanism to place said infusion chamber in the open position;
after the acts of pre-heating and sanitizing and controlling, in the open position, enabling the loading of the dose of the product for producing said beverage in said infusion chamber;
controlling said mechanism to place said infusion chamber in the closed position;
controlling said boiler, said pump and said hydraulic circuit to supply hot water to said infusion chamber to produce said beverage; and
controlling said mechanism to place said infusion chamber in the open position enabling discharge of the exhausted product therefrom.

2. The machine as claimed in claim 1, wherein said steam generator has an inlet connected to said boiler to receive water from said boiler for generating the steam for preheating.

3. The machine as claimed in claim 1, wherein said steam generator has an inlet connected to a line supplying water substantially at ambient temperature.

4. The machine as claimed in claim 1, wherein said steam generator has an outlet in fluid connection with a pipe for supplying water from said boiler to said infusion unit.

5. The machine as claimed in claim 4, wherein said machine further comprises a three-way valve having a first inlet connected to the boiler, a second inlet connected at the outlet of said steam generator and an outlet connected to the pipe for supplying water from the boiler to the infusion unit, said three-way valve being controllable by said control unit.

6. The machine as claimed in claim 1, wherein said control unit is programmed to maintain said infusion chamber in the closed position for at least part of the time interval between two consecutive infusion cycles.

7. The machine as claimed in claim 1, wherein said control unit is programmed to activate preheating at the beginning of an infusion cycle when at least one condition to enable preheating is satisfied.

8. The machine as claimed in claim 7, wherein said at least one condition comprises said control unit activating preheating at the beginning of a dispensing cycle when a specific time interval has elapsed since a preceding dispensing cycle, and wherein said control unit to dispense with the preheating at the beginning of an infusion cycle when the elapsed since a preceding dispensing cycle is less than a predetermined time.

9. The machine as claimed in claim 8, wherein said time interval is variable as a function of at least one control variable.

10. The machine as claimed in claim 9, wherein said control variable is the ambient temperature.

11. The machine as claimed in claim 1, wherein said control unit is programmed to cause opening of the infusion chamber, discharge of the spent product from the infusion chamber and dwell of the infusion chamber in the open position for a first time interval and to cause closing of the infusion chamber after said first time interval in the absence of a request for a new dispensing cycle.

12. The machine as claimed in claim 11, wherein said control unit is programmed to begin a dispensing cycle with preheating of the infusion unit if, when said dispensing cycle is requested, a second time interval, greater than said first time interval, has elapsed.

* * * * *